United States Patent
Ruemmler

(10) Patent No.: US 8,020,166 B2
(45) Date of Patent: Sep. 13, 2011

(54) DYNAMICALLY CONTROLLING THE NUMBER OF BUSY WAITERS IN A SYNCHRONIZATION OBJECT

(75) Inventor: Christopher P. Ruemmler, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1267 days.

(21) Appl. No.: 11/657,962

(22) Filed: Jan. 25, 2007

(65) Prior Publication Data
US 2008/0184238 A1  Jul. 31, 2008

(51) Int. Cl.
*G06F 9/46* (2006.01)
*G06F 13/00* (2006.01)

(52) U.S. Cl. ........ 718/104; 718/102; 711/148; 711/150; 711/151; 711/152

(58) Field of Classification Search ............ 718/102
See application file for complete search history.

(56) References Cited

U.S. PATENT DOCUMENTS

| | | | |
|---|---|---|---|
| 5,710,881 A | 1/1998 | Gupta et al. | |
| 6,427,161 B1 * | 7/2002 | LiVecchi | 718/102 |
| 6,560,628 B1 * | 5/2003 | Murata | 718/103 |
| 6,567,839 B1 * | 5/2003 | Borkenhagen et al. | 718/103 |
| 6,675,192 B2 | 1/2004 | Emer et al. | |
| 6,694,411 B2 | 2/2004 | Bonola | |
| 6,779,090 B2 | 8/2004 | McKenney et al. | |
| 6,941,379 B1 * | 9/2005 | Dingsor et al. | 709/235 |
| 7,100,014 B2 | 8/2006 | Ruemmler et al. | |
| 7,346,720 B2 * | 3/2008 | Fachan | 710/200 |
| 7,363,369 B2 * | 4/2008 | Banerjee et al. | 709/224 |
| 7,383,368 B2 * | 6/2008 | Schopp | 710/200 |
| 7,594,234 B1 * | 9/2009 | Dice | 718/108 |
| 2002/0107854 A1 * | 8/2002 | Hua et al. | 707/8 |
| 2005/0081204 A1 * | 4/2005 | Schopp | 718/100 |
| 2006/0206897 A1 * | 9/2006 | McConnell | 718/104 |

* cited by examiner

*Primary Examiner* — Meng A An
*Assistant Examiner* — Abdullah Al Kawsar

(57) ABSTRACT

An embodiment of the invention provides an apparatus and a method of dynamically controlling the number of busy waiters in for a synchronization object. The apparatus and method perform the steps of increasing a number of allowed busy waiters if there is a waiter in a sleep state and there are no current busy waiters when a requester releases the synchronization object, and decreasing the number of allowed busy waiters if a busy waiter moves from a busy waiting state to the sleep state.

21 Claims, 2 Drawing Sheets

US 8,020,166 B2

DYNAMICALLY CONTROLLING THE NUMBER OF BUSY WAITERS IN A SYNCHRONIZATION OBJECT

TECHNICAL FIELD

Embodiments of the invention relate generally to dynamically controlling the number of busy waiters in a synchronization object.

BACKGROUND

In a computing device, multiple requesters (e.g., software threads, processors, or other hardware) may contend for access to a shared object such as, for example, a critical section in a memory, a shared data structure, a semaphore, or other suitable shared resources. An arbitration scheme is typically used so that only one requester can access the shared object at a time. The arbitration scheme uses a lock (i.e., synchronization object) that is associated with the shared object so that the other requesters will be blocked from accessing the shared object until the current requester has completed its operation in the shared object and has released the lock. The lock is typically a bit value that is set in a memory location of the shared object. Typically, the lock will have a bit value (logical "1" or logical "0") that is set by the requester when the requester has ownership of the lock.

Busy waiting is a commonly-used method for improving the throughput (rate) of acquisition of locks for shared objects. A software thread is a stream of instructions that are being executed by a processor. When a software thread performs busy waiting (i.e., spinning), the software thread will wait (spin) for a lock to become available and may obtain the lock after the lock is released by another thread that is currently holding the lock. Threads wanting access to a currently unavailable shared object will busy wait for some amount of time (provided that busy waiting is permitted by the system) and will eventually go into a sleep state if the thread is unable to obtain the lock within that time amount for busy waiting. As known to those skilled in the art, busy waiting is when the thread waits for an event (e.g., availability of the lock) by spinning through a tight loop or a timed-delay loop that polls for the event on each pass by the thread through the loop. As also known to those skilled in the art, when a thread is placed in the sleep state, the thread is deactivated by a scheduler and the thread is then re-activated when a given external event occurs such as, for example, the expiration of the sleep time period. In the sleep state, the thread is typically placed in a queue of threads waiting for the lock. When a thread is placed in the sleep state, the thread does not consume a significant amount of processor time.

However, too much busy waiting or having too many threads that are busy waiting can waste processor power. Also, having too many threads that are busy waiting can also increase the bus traffic in the computer system after the lock is released because all of the threads that are busy waiting will contend for the released lock. In contrast, too little busy waiting can result in a low throughput of acquisition of locks. In addition, for critical sections where the hold time for a lock is typically large, having many busy waiters can waste processing power. On the other hand, when the hold time for a lock is small, having many busy waiters (i.e., threads in the busy waiting state) can greatly increase the lock acquisition throughput but can also waste processor power due to the spin cycles by the waiting threads. Therefore, having a fixed number of busy waiters or allowing all threads to busy wait may not result in efficient behavior of the computer system in all instances.

Most previous mechanisms that attempt to control the amount of wasted processor time in busy waiting involve using a fixed number of busy waiters. For example, Solaris® from SUN MICROSYSTEMS, INCORPORATED, provides a method to control the maximum number of busy waiters that are allowed for their pthread mutexes (POSIX-standard tread mutual exclusion). However, the method used in Solaris does not appear to dynamically adjust the number of busy waiters, and instead caps (limits) the number of busy waiters at a maximum value. While this method may provide good performance, this method may also disadvantageously waste processing resources for highly contended locks with both short hold times and long hold times for the locks.

Other known previous approaches focus on making the busy waiting as efficient as possible with regard to reducing the bus activity after the lock is released, but do not disclose in dynamically adjusting the number of busy waiters.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
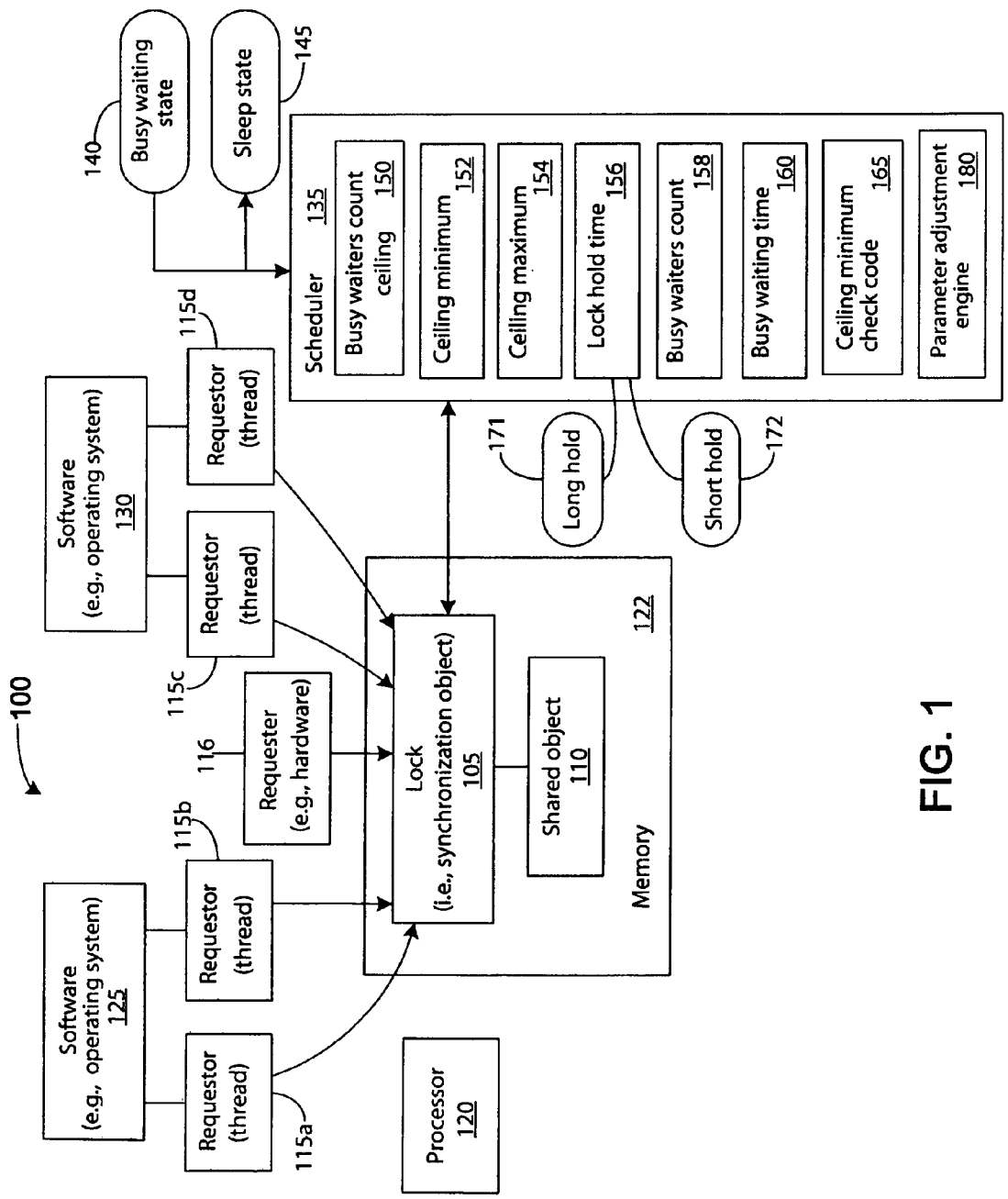
FIG. 1 is a block diagram of an apparatus (system) in accordance with an embodiment of the invention.

FIG. 1 is a block diagram of an apparatus (system) 100 in accordance with an embodiment of the invention. A lock (i.e., synchronization object) 105 is associated with a shared object 110. As known to those skilled in the art, a shared object 110 may be, for example, a critical section in a memory, a shared data structure, a semaphore, or other suitable shared resources. Typically, a lock 105 is a bit value (logical "1" or logical "0")) that is set in a memory location of the shared object 110. For example, a software thread (e.g., thread 115a or 115b) will set the bit value in the lock 105 when the thread has ownership of the lock 105. A software thread is a stream of instructions that are being executed by a processor 120. The software thread can access or perform operations in the shared object 110 when the software thread has ownership of the lock 105 that is associated with the shared object 110.

In the example of FIG. 1, the requesters 115a-115d are software threads 115a-115d. A requester that can access, hold, and release the lock 105 can also be a hardware component. For example, the requester 116 that can access, hold, and release the lock 105 can be a hardware component such as, for example, a processor.

When a thread (e.g., thread 115a) has ownership of the lock 105, other threads (e.g., threads 115b-115d) will not have ownership of the lock 105 and, therefore, these other threads will not be able to access and will not be able to perform operations on the shared object 110.

In FIG. 1, as an example, the threads 115a and 115b are streams of instructions that are to be executed by the processor 120 for a software 125 (e.g., an operating system or other software). As a further example, the threads 115c and 115d are streams of instructions that are to be executed by the processor 120 for another software 130 (e.g., an application software or other software). The number of threads associated with a software and the number of software in the system 100 may vary.

A scheduler 135 can place any software thread (e.g., threads 115a-115d) in a busy waiting state 140 or a sleep state 145. When a thread is busy waiting (i.e., is in the busy waiting state), the thread is referred herein as a "busy waiter". When a thread is sleeping (i.e., is in the sleep state), the thread is referred herein as a "waiter".

As known to those skilled in the art, busy waiting is when the thread waits for an event (e.g., the availability of the lock) by spinning through a tight loop or a timed-delay loop that polls for the event on each pass by the thread through the loop. As also known to those skilled in the art, when a thread is placed in the sleep state, the thread is deactivated by a scheduler and the thread is then re-activated when a given external event occurs such as, for example, the expiration of the sleep time period. In the sleep state, the thread is typically placed in a queue of threads waiting for the lock. When a thread is placed in the sleep state, the thread does not consume a significant amount of processor time.

In accordance with an embodiment of the invention, a scheduler 135 can dynamically increase and decrease the number of busy waiters (i.e., software threads or other requesters that are busy waiting) based on access patterns associated with the shared object 110, as described below in additional details. Dynamically increasing or decreasing the number of busy waiters means that the scheduler 135 increases or decreases the number of busy waiters at runtime of the system 100 for each shared object 110. Specifically, the scheduler 135 determines whether to dynamically decrease or increase the number of active busy waiters based upon the number of unsuccessful busy waits by a software thread or other requester (i.e., when a software thread or other requester does not obtain the lock 105 during busy waiting) combined with the number of times a lock 105 is released when there are waiters that are sleeping and there no current busy waiters, as discussed further below.

The scheduler 135 can be implemented by use of known programming languages such as, e.g., C or C++, and can be programmed by use of standard programming techniques.

A problem solved by an embodiment of the invention is to dynamically control the number of busy waiters that are attempting to access a shared object 110 so that throughput of acquisition of locks is not decreased and processor power is not wasted for the different lock acquisition rates and lock hold times. For a highly contended lock (synchronization object) with a short lock hold time, the scheduler 135 can dynamically increase the number of busy waiters to handle the higher lock turnover load (i.e., the higher occurrence of exchange of locks between the software threads). For a lock that is highly contended by software threads but has a long lock hold time, the scheduler 135 can dynamically decrease the number of busy waiters so that the processing power that is wasted due to busy waiting is advantageously reduced. Additionally, for locks with low contention among the software threads, the scheduler 135 would maintain the number of busy waiters at a relatively small value, since busy waiting by the software threads will not occur frequently, as discussed below.

In contrast, in previous methods where the number of busy waiters are capped or limited to, for example, 2 busy waiters or another maximum number, the additional threads that will be waiting for the lock will be placed in a sleep state if the busy waiters are already at the maximum number. For a shorter lock hold time, the throughput in the computer system will be disadvantageously reduced because the busy waiters that obtain the lock will hold the lock for a relatively shorter time and the potentially higher number of waiters that could be sleeping will require the extra time to move away from the sleep state. For a longer lock hold time, processing power is disadvantageously wasted because the busy waiters will spin for a relatively longer time while waiting for a lock. In contrast, an embodiment of the invention is able to quickly adapt dynamically to the changing access patterns for threads to a shared object to minimize the amount of wasted processing power while maximizing the lock acquisition throughput that can be obtained for a lock, as discussed below.

Figure 2:
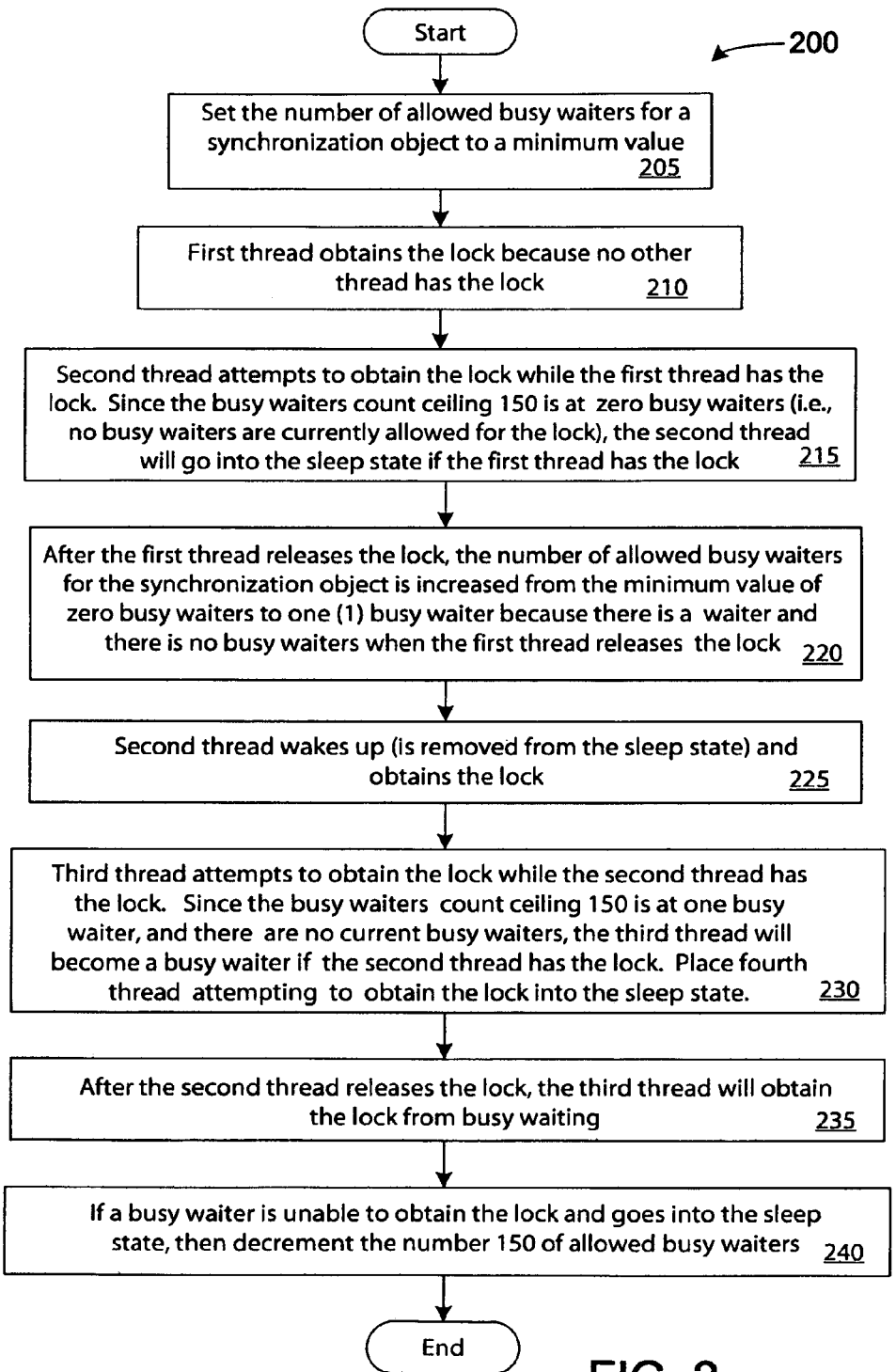
FIG. 2 is a flow diagram of a method in accordance with an embodiment of the invention.

Reference is now made to the apparatus 100 of FIG. 1 and method 200 of FIG. 2 for purposes of describing additional details of an embodiment of the invention. In block 205 (FIG. 2), the scheduler 135 (FIG. 1) sets a busy waiters count ceiling 150 to a ceiling minimum value 152 for a lock 105. The lock 105 is typically associated with a shared object 110. The busy waiters count ceiling 150 determines the number of busy waiters (i.e., the software threads or other requesters that are allowed to busy wait) for a lock 105. In the example below, the ceiling minimum value 152 will be zero (0) busy waiters, although this ceiling minimum value 152 can be other values such as, for example, one or more busy waiters. If the ceiling minimum value 152 is set at zero busy waiters, then no software thread will be allowed to busy wait 140 for a particular lock 105. If the ceiling minimum value 152 is set at one busy waiter, then a maximum number of one software thread will be allowed to busy wait 140 for a particular lock 105.

In block 210 (FIG. 2), assume that a first software thread (e.g., thread 115a) attempts to obtain the lock 105 in order to access or perform an operation on the shared object 110. Since no other thread currently has the lock 105, the first thread 115a will obtain the lock 105 for a busy wait time period as determined by a lock hold time 1.56 (FIG. 1). The lock hold time 156 is a function of the thread that is executing a shared object (i.e., holder of the lock). The scheduler 135 could observe the lock hold times 156 and adjust the ceilings 150, 152, and/or 154 based on the hold times 154, but does not adjust the hold time 156.

In block 215 (FIG. 2), assume that a second software thread (e.g., thread 115b) attempts to obtain the lock 105 while the first thread 115a has the lock 105. Since the busy waiters count ceiling 150 is at zero busy waiters (i.e., no busy waiters are currently allowed for the lock 105), the second thread 115b will go into the sleep state 145 if the first thread 115a has the lock.

The scheduler 135 maintains the busy waiters count 158 (FIG. 1) which indicates the current number of busy waiters for the shared object 110. Therefore, if there are no current busy waiters, then the busy waiters count 158 will be at zero busy waiters and if there is one current busy waiter, then the busy waiters count 158 will be at one busy waiter.

The first thread 115a will release the lock 105 when it has finished executing in the shared object 110. The period that the lock is held by a requester is the lock hold time 156.

In block 220 (FIG. 2), after the first thread 115a releases the lock 105, the scheduler 135 will increase the number of allowed busy waiters for the synchronization object 105 (as indicated in the ceiling 150) from the minimum value 152 of zero busy waiters to one (1) busy waiter because there is a waiter in the sleep state 145 and there are no current busy waiters when the first thread 115a releases the lock 105. In this example as noted in block 215 above, the second thread 115b is the waiter (i.e., thread (requester) in the sleep state 145). Therefore, when a thread releases the lock 105 and there is at least one waiter and no current busy waiters, the scheduler 135 will increment the number 150 of allowed busy waiters for a lock 110. In an embodiment of the invention, the scheduler 135 increments the number 150 of allowed busy waiters because the presence of a waiter in the sleep state 145 and no busy waiters (i.e., no threads in the busy waiting state 140), when the lock 105 is released, is an indication of the need for more busy waiters in order to increase lock acquisition throughput.

In contrast, if a thread releases the lock 105 and there is at least one waiter and at least one current busy waiter, the scheduler 135 will not increment the number 150 of allowed busy waiters for a synchronization object 150. In an embodiment of the invention, the presence of a busy waiter during the release of the lock 105 prevents the increase in the number 150 of allowed busy waiters even if there is at least one waiter (i.e., thread or other requester in the sleep state 145) during the release of the lock 105.

In other embodiments of the invention, the rate of increase of the number 150 of allowed busy waiters can be varied by permitting the scheduler 135 to only increase the number 150 for every two, or three, or more occurrences of when there is a waiter in the sleep state 145 and no busy waiters when the lock 105 is released. The scheduler 135 can set this rate of increase of the number 150 of allowed busy waiters by use of the parameter adjustment engine 180 (FIG. 1).

In other embodiments of the invention, a ceiling maximum value 154 can be optionally set. This ceiling maximum value 154 is the maximum allowable number of busy waiters for a lock 105. Therefore, the ceiling maximum value 154 is the highest allowed value for the busy waiters count ceiling 150.

In block 225 (FIG. 2), the second thread 115b wakes up (i.e., the scheduler 135 removes the second thread 115b from the sleep state 145), and the second thread 115b will then obtain the lock 105.

In block 230 (FIG. 2), assume that a third software thread (e.g., thread 115c) attempts to obtain the lock 105 while the second thread 115b has the lock 105. Since the busy waiters count ceiling 150 is at one busy waiter (i.e., one busy waiter is currently allowed for the lock 105) and there are no current busy waiters, the third thread 115c will become a busy waiter (i.e., go into the busy waiting state 140) if the second thread 115b has the lock 105.

Each busy waiter waits for a maximum amount of time to try to obtain the lock 105. This maximum amount of time for busy waiting is represented by the busy waiting time 160 (FIG. 1). An example time length of the busy waiting time 160 is approximately 0.5 milliseconds, although other example time values can be used for the busy waiting time 160. If a busy waiter does not obtain the lock 105 within the time limit that is set by the busy waiting time 160, then the busy waiter will move from the busy waiting state 140 to the sleep state 145. When the busy waiter moves to the sleep state 145, the busy waiter will relinquish the processor 120 to another software thread and will not be able to contend for a released lock 105 until the scheduler 135 wakes up the sleeping software thread from the sleep state 145.

In block 230, if a fourth thread 115d attempts to obtain the lock 105 and there is another thread (e.g., thread 115b) that currently holds the lock 105 and another thread (e.g., thread 115c) that is busy waiting, then the scheduler 135 will place the fourth thread 115d in a sleep state 145d because the ceiling 150 sets the allowed number of busy waiters to one busy waiter as discussed above with reference to block 220.

In block 235 (FIG. 2), after the second thread 115b releases the lock 105, the third thread 115c will obtain the lock 105 from busy waiting 140. Note that less time is required for a thread to obtain the lock 105 from busy waiting 140 as opposed to from the sleep state 145 because the scheduler 135 is not required to wake up the thread that is busy waiting 140.

In block 235, if a thread releases the lock 105 and there are no busy waiters and there is a thread in the sleep state (e.g., fourth thread 114d), then the scheduler 135 will increment the busy waiters count ceiling 150 from one allowed busy waiter to two (2) allowed busy waiters. The scheduler 135 increments the number 150 of allowed busy waiters because the presence of waiters (sleeping threads) and no busy waiters, when a lock 105 is released, is an indication of the need for more busy waiters so that lock acquisition throughput can increase. If the ceiling maximum 154 is used in the scheduler 135, then the busy waiters count ceiling 150 is only incremented if it is less than the maximum number 154 of allowable busy waiters. In one embodiment of the invention, the busy waiters count ceiling 150 does not fall below the ceiling minimum 152 and does not rise above the ceiling maximum 154.

Note that the scheduler 135 increments the busy waiters count ceiling 150 if there are currently no busy waiters, but there are waiters (i.e., threads or other requesters in the sleep state 145) when a lock 105 is released by a thread. If there are waiters and no busy waiters when a lock 105 is released, then there were possibly not enough busy waiters to obtain the lock while busy waiting when the lock was released. Therefore, the number of busy waiters is likely to be too low. However, this may also be a "false positive" if the lock hold time 156 of the shared object 110 is longer, which results in inefficient busy waiting because the busy waiters will move to the sleep state if their busy waiting time 160 expires before the lock hold time 156 expires. This results in processor time that is wasted because the busy waiting in this instance does not increase the lock acquisition throughput Block 240 (FIG. 1) prevents or minimizes the occurrences when processor time is wasted. If a busy waiter (e.g., third thread 115c) is unable to obtain the lock 105 during busy waiting 140 and then goes into the sleep state 145, then the scheduler 135 will decrement the number 150 of allowed busy waiters. Therefore, for locks 105 with a long hold time 171 (e.g., approximately 10 milliseconds to approximately 100 milliseconds), the scheduler 135 can control and limit the number of busy waiters, and this limit on the number of busy waiters minimizes processing power that is wasted.

In one embodiment, the scheduler 135 resets the number 150 of allowed busy waiters to the ceiling minimum 152 which was zero busy waiters in the above example or one busy waiter in another example. The ceiling minimum 152 can be other values. By resetting the number 150 of allowed busy waiters to the ceiling minimum 152, the scheduler 135 will not be required to block other threads that will read the value 150 when the scheduler 135 decrements the value 150. In another embodiment, the scheduler 135 can decrement the number 150 by one busy waiter for each time that a busy waiter goes into the sleep state 145. This other embodiment will typically require the scheduler 135 to include a ceiling minimum check code 165 (FIG. 1) which checks and ensures that the number 150 of allowed busy waiters does not fall below the ceiling minimum 152.

In other embodiments of the invention, the rate of decrease of the number 150 of allowed busy waiters can be varied by permitting the scheduler 135 to only decrease the number 150 for every two, or three, or more occurrences of when there is a busy waiter that moves to the sleep state 145. The scheduler 135 can set this rate of decrease of the number 150 of allowed busy waiters by use of the parameter adjustment engine 180 (FIG. 1).

There are various advantages to dynamically adapting the number of busy waiters for a lock (i.e., synchronization object) in accordance with embodiments of the invention. One advantage is that this method does not waste as much processing power while threads or other requesters are busy waiting for the lock because the number of threads that can busy wait can be limited. In contrast, previous solutions that allow all threads to busy wait have the disadvantage of wasting processing power for heavily contended locks with relatively long hold times and even for objects with short hold times. Previous solutions that fix the number of threads at some value can be made to work well for short hold time locks or long hold time locks, but not both cases. In these previous solutions, either the lock acquisition throughput is reduced or processing power is not efficiently used. In contrast, an embodiment of the invention maximizes the lock acquisition throughput for all lock hold times (including long hold times 171 and short hold times 172) while minimizing wasted processing cycles by dynamically adjusting the number of allowed busy waiters. An example of a short hold time is approximately 1 microseconds or less or other relatively short time periods. An embodiment of the invention may also advantageously permit various pthread mutex implementations to perform well under contention by threads under a wide range of lock hold times and provide improved performance over a wide range of applications. An embodiment of the invention can also be advantageously used in combination with other methods for achieving efficiency in busy waiting.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of dynamically controlling a number of busy waiters waiting for a synchronization object, the method comprising:
    setting the number of allowed busy waiters to an initial value;
    increasing a number of allowed busy waiters if there is a waiter in a sleep state and there are no current busy waiters when a requester releases the synchronization object; and
    decreasing the number of allowed busy waiters if a busy waiter moves from a busy waiting state to the sleep state, wherein decreasing the number of allowed busy waiters comprises resetting the number of allowed busy waiters to the initial value, decrementing the number of allowed busy waiters, or both.

2. The method of claim 1, wherein a busy waiter comprises a software thread.

3. The method of claim 1, wherein increasing the number of allowed busy waiters comprises incrementing the number of allowed busy waiters.

4. The method of claim 1, wherein a busy waiter performs busy waiting within a busy waiting time period.

5. The method of claim 1, further comprising: setting a value for a busy waiting time period.

6. The method of claim 1, further comprising:
    varying a rate of increase of the number of allowed busy waiters.

7. The method of claim 1, further comprising:
    varying a rate of decrease of the number of allowed busy waiters.

8. The method of claim 1, further comprising:
    setting a maximum allowable number of busy waiters for the synchronization object.

9. The method of claim 1, wherein the synchronization object permits a requester to access a shared object.

10. A microprocessor-based apparatus for dynamically controlling a number of busy waiters waiting for a synchronization object, the apparatus comprising:
    a processor;
    a scheduler configured to:
        set a number of allowed busy waiters to an initial value;
        increase a number of allowed busy waiters if there is a waiter in a sleep state and there are no current busy waiters when a requester releases the synchronization object; and
        decrease the number of allowed busy waiters if a busy waiter moves from a busy waiting state to the sleep state, wherein decreasing the number of allowed busy waiters comprises resetting the number of allowed busy waiters to the initial value, decrementing the number of allowed busy waiters, or both.

11. The apparatus of claim 10, wherein a busy waiter comprises a software thread.

12. The apparatus of claim 10, wherein the scheduler increases the number of allowed busy waiters by incrementing the number of allowed busy waiters.

13. The apparatus of claim 10, wherein the scheduler decreases the number of allowed busy waiters by decrementing the number of allowed busy waiters.

14. The apparatus of claim 10, wherein a busy waiter performs busy waiting within a busy waiting time period.

15. The apparatus of claim 10, wherein the scheduler sets a value for a busy waiting time period.

16. The apparatus of claim 10, wherein the scheduler varies a rate of increase of the number of allowed busy waiters.

17. The apparatus of claim 10, wherein the scheduler varies a rate of decrease of the number of allowed busy waiters.

18. The apparatus of claim 10, wherein the scheduler sets a maximum allowable number of busy waiters for the synchronization object.

19. The apparatus of claim 10, wherein the synchronization object permits a requester to access a shared object.

20. A microprocessor-based apparatus comprising a processor for dynamically controlling a number of busy waiters waiting for a synchronization object, the apparatus comprising:
- means for setting a number of allowed busy waiters to an initial value;
- means for increasing a number of allowed busy waiters if there is a waiter in a sleep state and there are no current busy waiters when a requester releases the synchronization object and for decreasing the number of allowed busy waiters if a busy waiter moves from a busy waiting state to the sleep state, wherein decreasing the number of allowed busy waiters comprises resetting the number of allowed busy waiters to the initial value, decrementing the number of allowed busy waiters, or both.

21. An article of manufacture comprising:
- a non-transitory machine-readable medium having stored thereon instructions when executed by a processor to:
- set a number of allowed busy waiters to an initial value;
- increase a number of allowed busy waiters if there is a waiter in a sleep state and there are no current busy waiters when a requester releases a synchronization object; and
- decrease the number of allowed busy waiters if a busy waiter moves from a busy waiting state to the sleep state, wherein decreasing the number of allowed busy waiters comprises resetting the number of allowed busy waiters to the initial value, decrementing the number of allowed busy waiters, or both.

\* \* \* \* \*